Dec. 21, 1926.  1,611,387
F. A. STEVENS ET AL
OPHTHALMIC MOUNTING
Filed May 15, 1922

Inventors:-
Frederick A. Stevens.
James W. Welsh.
David Rines
Attorney;-

Patented Dec. 21, 1926.

1,611,387

UNITED STATES PATENT OFFICE.

FREDERICK A. STEVENS AND JAMES W. WELSH, OF PROVIDENCE, RHODE ISLAND, ASSIGNORS, BY MESNE ASSIGNMENTS, TO BAUSCH AND LOMB OPTICAL COMPANY, OF ROCHESTER, NEW YORK, A CORPORATION OF NEW YORK.

OPHTHALMIC MOUNTING.

Application filed May 15, 1922. Serial No. 560,953.

The present invention relate to ophthalmic mountings comprising non-metallic members that are connected together by metal hinges, and it has for its object to secure the hinges in place upon the non-metallic members in a new and improved manner.

In commercial ophthalmic mountings of the above-described character, the hinge plates have hitherto been secured to the non-metallic members by pairs of rivets passing through the hinge plates and the members. These have not been fully satisfactory. It has been proposed to mount beveled hinge plates in previously prepared beveled grooves of the non-metallic members, and to hold them in place by cement or by single screws. There is a tendency, however, during the torsional movement of the temple, for the beveled walls of the hinge plates to twist or turn in their grooves, causing them to bite into the beveled groove walls and weakening the brittle, non-metallic material, so that the joint ultimately becomes very loose. A chief object of the invention is to improve upon ophthalmic mountings of the above described character.

Figure 1:
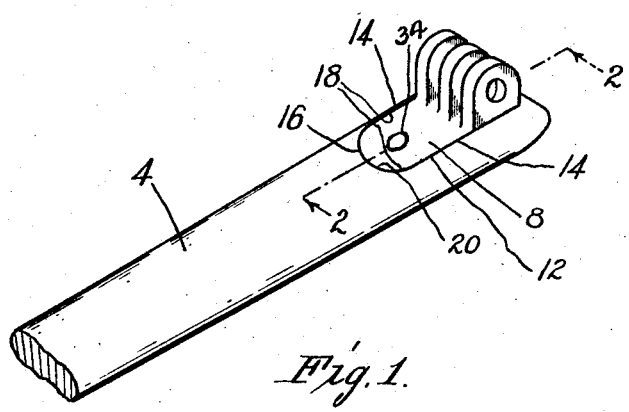
Figure 2:
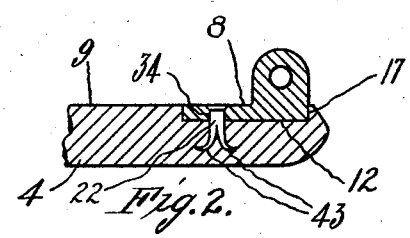

In the accompanying drawings, Fig. 1 is a fragmentary view of a spectacle temple, showing a hinge plate secured thereto according to the present invention; and Fig. 2 is a longitudinal section taken upon the line 2—2 of Fig. 1, looking in the direction of the arrows.

The invention is illustrated and described in connection with the mounting of a hinge plate 8 in a spectacle temple 4, constituted of plastic, non-metallic material like celluloid, zylonite or other composition. One face 9 of the temple or other mounting is first provided with a recess 12, the bottom wall of the recess 12 being substantially flat and the recess being shown provided with longitudinally extending walls 14 that may be straight and parallel, if desired, and that are connected by a transversely extending wall 16. There may be a wall 17 opposed to the wall 16 or the recess may be open-ended, as desired. The hinge plates 8 are similarly substantially flat and are provided with walls 18 that are connected by a wall 20. The hinge plates and the recesses 12 are so shaped that the hinge plates will fit tightly in the recesses, the hinge plates lying flat against the bottom flat walls of the recesses, with the walls 18 in contact with the walls 14, and the wall 20 in contact with the wall 16. The walls 14, 16, 18 and 20 are made blunt to prevent rotation or twisting of the hinge plates within the recesses 12. The hinge plate 8 is provided with an opening 34 adapted to receive a securing element 22. This element is provided with spurs 43. These spurs are originally more or less parallel, but they bend oppositely obliquely when the element is forced home, finally assuming the illustrated positions, in which the element is firmly embedded in the non-metallic material, maintaining the hinge plate 8 in position. If desired, a securing element of this character may be employed in addition to spurs provided upon the hinge plate.

The invention is not restricted to the exact embodiment thereof that is illustrated and described herein, but is subject to modification within the spirit and scope of the appended claims.

What is claimed as new is:—

1. An ophthalmic mounting comprising a member constituted of plastic material, a hinge plate mounted on the member, and an element for securing the hinge plate to the member having a plurality of spurs biting into and embedded within the material.

2. An ophthalmic mounting comprising a member constituted of plastic material one face of which is recessed, a hinge plate seated within the recess, and an element extending through the hinge plate having a plurality of spurs biting into and embedded within the material.

In testimony whereof, we have hereunto subscribed our names this 11th day of May, 1922.

FREDERICK A. STEVENS.
JAMES W. WELSH.